000
United States Patent Office 3,198,161
Patented Aug. 3, 1965

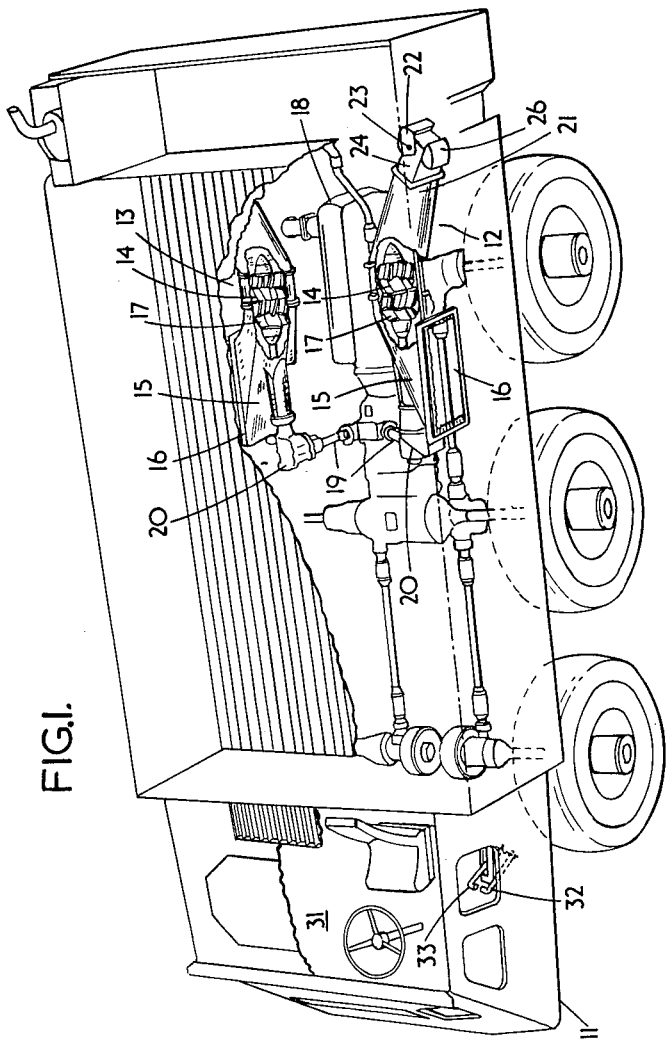

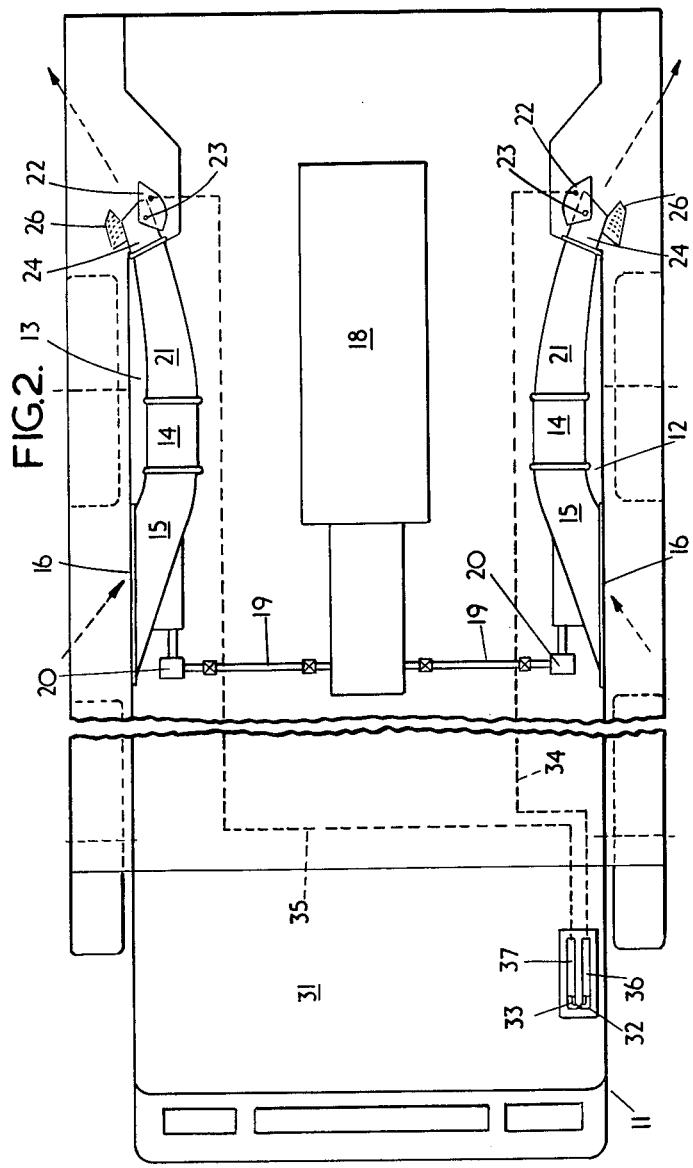

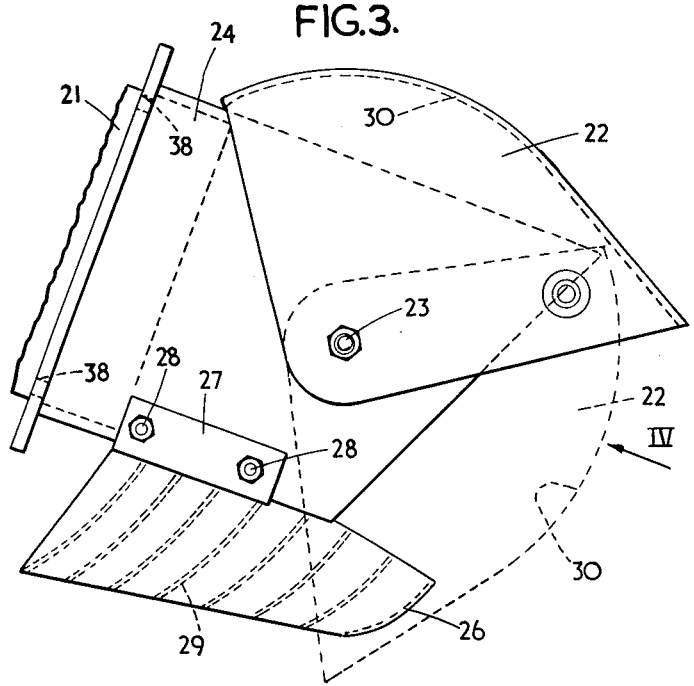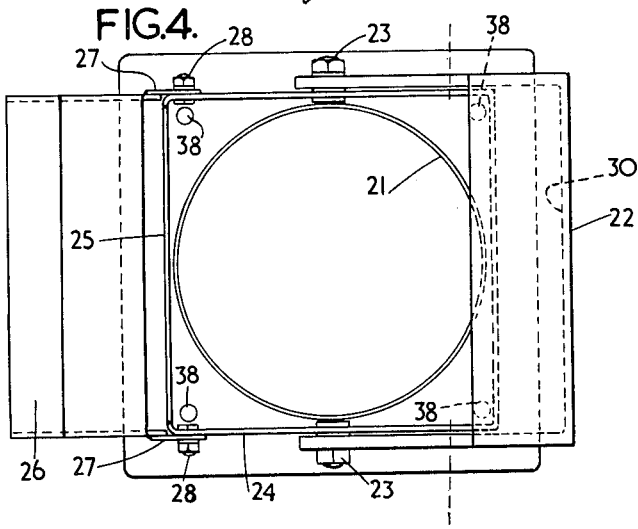

3,198,161
BOATS, AMPHIBIOUS VEHICLES AND OTHER WATERBORNE VESSELS
Thomas D. H. Andrews, Cheltenham, and Allen C. Walker, Longridge, near Stroud, England, assignors to Dowty Technical Developments Limited, Andoversford, Gloucester County, England, a British company
Filed May 7, 1963, Ser. No. 278,532
Claims priority, application Great Britain, May 9, 1962, 17,772/62; June 2, 1962, 21,351
6 Claims. (Cl. 115—14)

This invention relates to boats, amphibious vehicles and other waterborne vessels, hereinafter referred to, for convenience, as "vessels."

According to the invention, a vessel has one or more hydraulic jet propulsion apparatuses mounted on each side of the vessel, each apparatus including a pump, for drawing water into an intake duct to the pump and for discharging this water through and from a discharge duct, which is directed substantially rearwardly of the vessel, and also including steering means associated with the end portion of the discharge duct remote from the pump, the arrangement being such that in order to steer the vessel when travelling in a forward direction, the or each steering means on one side of the vessel can be operated to have a deflecting effect upon water which would otherwise discharge from the discharge duct associated with the steering means in a substantially rearward direction, whilst the or each steering means on the other side of the vessel has substantially no deflecting effect upon water discharging from its discharge duct.

Each steering means may comprise a single deflector pivotally mounted upon the discharge duct about an axis which is substantially vertical when the vessel is afloat and the steering means is only capable of deflecting discharged water from the discharge duct away from the longitudinal axis of the vessel. In this case, for effecting movement of the vessel upon the water in a rearward direction, all the steering means can be operated simultaneously to deflect the water through substantially 180 degrees.

A cascade vane assembly may be provided in association with the discharge duct in order to facilitate re-direction of the water issuing from the discharge duct in a forward direction to achieve rearward propulsion of the vessel.

Control linkage, for example mechanical, hydraulic, electrical or any combination of these, would be provided in the vessel for connection with the steering means and/or reversing means, in order to obtain the desired steering and reversing functions. The steering means of the apparatuses on one side of the vessel may be controllable by means of a control device and linkage separate from the control device and linkage for controlling the steering means of the apparatuses on the other side of the vessel.

One embodiment of the invention will now be particularly described by way of example with reference to the accompanying diagrammatic drawings, of which:

FIGURE 1 is an isometric view of a vessel in the form of an amphibious vehicle in accordance with the invention, FIGURE 2 is a plan view of the vehicle shown in FIGURE 1, FIGURE 3 is a plan view of a part of a jet propulsion apparatus forming part of the vehicle shown in FIGURES 1 and 2, and FIGURE 4 is an end-elevation of the part of the jet propulsion apparatus shown in FIGURE 3 viewed in the direction of arrow IV.

As shown in FIGURES 1 and 2 of the drawings, an amphibious vehicle 11 is provided with two hydraulic jet propulsion apparatuses 12 and 13 mounted inboard of the vehicle, one on either side thereof.

Each apparatus includes a pump 14 of the two-stage axial-flow type. The pump is provided with an intake duct 15 which places it in communication with an opening 16 which is disposed on a side of the vehicle and beneath the surface of the water when the vehicle is afloat. The rotors 17 of the pumps of both apparatuses are arranged to be driven by the engine 18 of the vehicle through drive shafts 19 and right-angle drives 20. When the vehicle is floating upon water, the pumps when operating are each arranged to draw in water through the intake duct 16 and to discharge this water as a jet through a discharge duct 21. Each discharge duct is directed substantially rearwardly of the vehicle, the jet of water discharging beneath the surface of the water in which the vehicle floats for propulsion of the vehicle in a forward direction. Each discharge duct is provided with steering means in the form of a deflector 22, the cross-sectional shape of which, in a horizontal plane when the vehicle is afloat, is substantially concavo-convex. The deflector is pivotally mounted at 23 upon that end portion 24 of the discharge duct 21 remote from the pump about an axis which is substantially vertical when the vehicle is afloat.

As shown more clearly in FIGURES 3 and 4, the discharge duct 21 merges from a circular cross-section into the end portion 24 which is of square cross-section.

A side-wall of the portion 24, that is the outermost side-wall in relation to the engine 18 is partly cut away at 25. A cascade vane assembly 26 is secured across this cut away portion 25 by flanges 27 and nuts and bolts 28.

The cascade vane assembly 26 comprises a plurality of curved vanes 29 arranged in parallel manner which place the interior of the portion 24 of the discharge duct in communication with the exterior of the apparatus to the outermost side thereof.

Each deflector 22 is capable of moving from an inoperative position as shown in full lines in FIGURE 3, in which it has no effect upon the jet of water issuing from the discharge duct, to an operative position, as shown in dotted lines in FIGURE 3 in which its concave surface 30 is presented to the jet so that it has a deflecting effect upon the discharge of water otherwise passing in the substantially rearward direction. When partially operative, the deflector deflects the water transversely of the vehicle, thus imparting a steering action. When fully operative the water is turned by the deflector and directed substantially forwardly of the vehicle through the cascade vane assembly 26, thereby to impart reverse movement to the vehicle.

For steering the vehicle when it is travelling upon the water in a forward direction, the deflector 22 on one side of the vehicle is operative to deflect the flow of water from the associated discharge duct in the substantially rearward direction, while the deflector 22 on the other side of the vehicle is arranged at the same time to have no deflecting effect upon the discharge of water from its associated discharge duct.

Thus, when the one deflector is adjusted, the balanced discharge from both apparatuses during straight-ahead movement of the vessel is disturbed, the deflected jet giving rise to a turning moment about the steering centre of the vehicle in the appropriate direction.

To obtain the maximum steering effect, one deflector 22 may be moved to the fully operative reverse position, whilst the other deflector is maintained in its inoperative position.

For effecting movement of the vehicle upon the water in a rearward direction, the deflectors 22 of both apparatuses 13 and 14 are operable simultaneously both to impede the flow of water from the discharge ducts in the rearward direction, and, by virtue of their concavo-convex shape, in their impeding position the deflectors cause the water to discharge in a direction substantially forwardly of the vehicle through the cascade vane assemblies 26.

When the deflectors are so positioned to cause rearward movement of the vehicle, it is possible to effect a differential adjustment of the settings of the deflectors from their impeding reverse positions. In this way transverse leakage of water is effected out through the resultant opening between the deflector and the vane assembly on the appropriate side of the vehicle to provide steerability of the vehicle in reverse.

Control of the deflectors 22 of the jet propulsion apparatuses 12 and 13 respectively on the port and starboard sides of the vehicle 11, is by control devices in the form of pivoted levers 32 and 33 respectively mounted in the driver's cabin 31. The lever 32 connects through a suitable linkage 34, shown diagrammatically, with the deflector 22 of the port apparatus 12, while the lever 33 connects through a separate linkage 35, again shown diagrammatically, with the deflector 22 of the starboard apparatus 13.

Thus, in the embodiment described the deflectors 22 of the port and starboard apparatuses are operable quite independently for steering and reverse control of the vehicle.

The levers 32 and 33 are mounted so as to be adjustable within the confines of slots 36 and 37. In the forward portion of these slots the driver of the vehicle can himself differentially control the settings of the deflectors 22 to obtain his desired steering operation. In the rearward portion of the slots 36 and 37, which is the reversing range, the driver can control the transverse leakage of water, referred to above, to achieve steerability of the vehicle in reverse.

As shown in FIGURE 4 of the drawings, apertures 38 are provided at the forward end of the portion 24 of the discharge duct 21. These apertures are connected by suitable piping (not shown) and admit atmospheric pressure to avoid expansion into irregular ducting (portion 24) with resultant frictional losses. In this way the operating efficiency of the apparatus is increased.

The geometry of each deflector 22 and its pivotal mounting is such that when the deflector is in its fully operative position a component of the thrust of the jet issuing from the discharge duct tends to hold the deflector in this position and therefore no means additional to the linkage is required to positively hold the deflector thus.

Although in the embodiment described with reference to the drawings the hydraulic jet propulsion apparatuses are mounted inboard of the vehicle, in alternative embodiments of the invention the apparatuses are mounted outboard of the vehicle or vessel.

We claim as our invention:

1. A vessel having at least one hydraulic jet reaction propulsion apparatus mounted on each side of the vessel, each apparatus including a discharge orifice to direct a jet rearwardly of the vessel for forward propulsion, and means for drawing in water and ejecting it through said orifice, a pivotally mounted deflecting means operatively associated with each discharge orifice, means to shift each deflecting means about its pivot axis between a nondeflecting position and a position in which rearward flow is obturated, and instead is deflected forwardly of the vessel, control means individual to each deflecting means to shift the same by any amount from nondeflecting position, independently of the opposite deflecting means, for steering, each deflecting means being of generally cylindrical shape about its pivot axis as a center, but each terminating in a flat exit lip which in the nondeflecting position is disposed angularly relative to the rearward direction of the issuing jet, whereby water reaction from the issuing jet tends to retain the deflecting means in its nondeflecting position.

2. A vessel is in claim 1, wherein the area of the flat lip is such that when the deflecting means is shifted from nondeflecting position towards a deflecting position, the frictional loads of the water upon the cylindrical surfaces and out past the flat lip are greater than the opposing moment due to the thrust component upon said lip, and tend to hold the deflecting means in a deflecting position.

3. A vessel as claimed in claim 1, wherein each deflecting means comprises a single deflector pivotally mounted upon the discharge duct about an axis which is substantially vertical when the vessel is afloat and the deflecting means when in non-deflecting position is located inboard of the orifice, whereby the deflecting means is only capable of deflecting discharged water from its discharge duct away from the longitudinal axis of the vessel.

4. A vessel as claimed in claim 3, wherein for effecting movement of the vessel upon the water in a rearward direction, both deflecting means are arranged to be operated simultaneously, each to a position angularly distant from its nondeflecting position, to direct the discharging water forwardly, for rearward movement of the vessel.

5. A vessel as claimed in claim 4, wherein each discharge duct is provided with a cascade vane assembly positioned to receive water issuing from the duct in order to facilitate redirection of such water in a forward direction for rearward propulsion of the vessel.

6. A vessel as claimed in claim 4, including a cascade vane assembly fixedly mounted alongside the outlet of each discharge duct outside the rearwardly issuing jet for forward propulsion, the deflecting means for each duct being so arranged that when the same is in position for rearward propulsion, it directs the deflected jet through said cascade vane assembly, and the vanes thereof further deflect the issuing jet forwardly.

References Cited by the Examiner

UNITED STATES PATENTS

| 2,024,274 | 12/35 | Campini | 115—11 |
| 2,404,528 | 7/46 | Rankin et al. | 115—1 |
| 2,406,290 | 8/46 | Hait | 115—1 |
| 2,408,928 | 10/46 | Hait | 115—1 |
| 3,089,454 | 5/63 | Chronic | 115—12 |

FOREIGN PATENTS 604,023  6/45  Great Britain.

MILTON BUCHLER, *Primary Examiner.*

ANDREW H. FARRELL, *Examiner.*